United States Patent
Chen et al.

(10) Patent No.: US 12,066,855 B2
(45) Date of Patent: Aug. 20, 2024

(54) MULTI-PORT CIRCUIT ARCHITECTURE

(71) Applicant: Arm Limited, Cambridge (GB)

(72) Inventors: Andy Wangkun Chen, Austin, TX (US); Yew Keong Chong, Austin, TX (US); Sriram Thyagarajan, Austin, TX (US); Akash Bangalore Srinivasa, Bangalore (IN); Munish Kumar, Greater Noida West (IN); Khushal Gelda, Jaipur (IN); Akshay Kumar, New Delhi (IN)

(73) Assignee: Arm Limited, Cambridge (GB)

( * ) Notice: Subject to any disclaimer, the term of this patent is extended or adjusted under 35 U.S.C. 154(b) by 1 day.

(21) Appl. No.: 18/091,719

(22) Filed: Dec. 30, 2022

(65) Prior Publication Data
US 2024/0219955 A1    Jul. 4, 2024

(51) Int. Cl.
G06F 1/00    (2006.01)
G06F 1/06    (2006.01)
G06F 1/10    (2006.01)
G06F 11/30   (2006.01)

(52) U.S. Cl.
CPC ................ *G06F 1/10* (2013.01); *G06F 1/06* (2013.01); *G06F 11/3062* (2013.01)

(58) Field of Classification Search
CPC ........... G06F 1/10; G06F 1/06; G06F 11/3062
See application file for complete search history.

(56) References Cited

U.S. PATENT DOCUMENTS

| | | | |
|---|---|---|---|
| 8,397,034 B1* | 3/2013 | Rezeanu | G11C 7/1075 711/152 |
| 9,343,124 B1* | 5/2016 | Chen | G06F 12/0853 |
| 2007/0201297 A1 | 8/2007 | Kim | |
| 2007/0242554 A1* | 10/2007 | Kim | G11C 7/222 365/230.05 |
| 2007/0245094 A1* | 10/2007 | Lee | G06F 13/4054 711/149 |
| 2014/0177344 A1* | 6/2014 | Marimuthu | G11C 7/1057 365/189.05 |
| 2016/0292112 A1* | 10/2016 | Winemiller | G06F 13/372 |

OTHER PUBLICATIONS

UKIPO Search Report; GB 2318887.3; May 13, 2024.

* cited by examiner

*Primary Examiner* — Xuxing Chen
(74) *Attorney, Agent, or Firm* — Pramudji Law Group PLLC; Ari Pramudji

(57) ABSTRACT

Various implementations described herein are related to a device having multi-port circuit architecture with multiple ports. The multi-port circuit architecture may expand a primary clock into multiple dummy clocks so as to separately track, simulate and report clock power consumption for each port of the multiple ports to a central processing unit.

20 Claims, 7 Drawing Sheets

300C

Dummy Clock Architecture 304,304C

```
pin(CLKA){
  internal_power() {
    when:<port-wise power SDF for port 0>
      <rise and fall power numbers>
  }
  internal_power() {
    when:<common power SDF for port 0>
      <rise and fall power numbers>
  }
```

```
pin(CLKA_Dummy_1){
  internal_power() {
    when:<port-wise power SDF for port 1>
      <rise and fall power numbers>
  }
```

```
pin(CLKA_Dummy_2){
  internal_power() {
    when:<port-wise power SDF for port 2>
      <rise and fall power numbers>
  }
```

⋮

```
pin(CLKA_Dummy_N){
  internal_power() {
    when:<port-wise power SDF for port N>
      <rise and fall power numbers>
  }
```

Dummy Clock Architecture 304,304D

```
pin(CLKB){
  internal_power() {
    when:<port-wise power SDF for port 0>
      <rise and fall power numbers>
  }
  internal_power() {
    when:<common power SDF for port 0>
      <rise and fall power numbers>
  }
```

```
pin(CLKB_Dummy_1){
  internal_power() {
    when:<port-wise power SDF for port 1>
      <rise and fall power numbers>
  }
```

```
pin(CLKB_Dummy_2){
  internal_power() {
    when:<port-wise power SDF for port 2>
      <rise and fall power numbers>
  }
```

...

```
pin(CLKB_Dummy_N){
  internal_power() {
    when:<port-wise power SDF for port N>
      <rise and fall power numbers>
  }
```

410 — fabricate multi-port circuit architecture with multiple ports configured to use a primary clock and multiple dummy clocks 420 — separately track, simulate and report clock power consumption for each port of the multiple ports to a central processing unit (CPU) by expanding the primary clock into the multiple dummy clocks 430 — utilize internal control logic for separately reporting the internal clock power consumption for each port of the multiple ports to the CPU 440 — utilize shared control logic for reporting the common clock power consumption for a primary port of the multiple ports to the CPU

FIG. 4

MULTI-PORT CIRCUIT ARCHITECTURE

BACKGROUND

This section is intended to provide basic information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

In modern processors, dynamic power is a critical constraint on overall design, and thus, accurate reporting of dynamic power consumed by sub-blocks in the processor may be necessary. This enables the processor designer to make accurate trade-offs on activity to manage the overall power budget. In multi-port memories, power consumed by a memory sub-block depends linearly on the number of ports accessed and also depends on how many slices of memory are accessed. For a single clock pin (as is conventional), reporting of all powers may require modelling them as different conditions to a single clock pin power. This may be impractical due to the number of conditions that would end up being necessary for accurate power reporting. The workaround for modelling power may be to estimate the power in certain conditions, but that may require reporting pessimistic or optimistic powers, which defeats the intention of accurate power reporting. Therefore, to overcome deficiencies of conventional processor designs, improved multi-port memory having more efficient multi-port bitcell designs are needed to improve routing congestion, reduce read/write margins, and also reduce area of integrated circuitry.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

FIGS. 3A-3D illustrate diagrams of dummy clock architecture for multi-port register applications in accordance with various implementations described herein.

FIG. 4 illustrates a process flow diagram of a method for fabricating multi-port circuit architecture in accordance with various implementations described herein.

DETAILED DESCRIPTION

Various implementations described herein are directed to efficient and scalable multi-port circuit architecture designs for multi-port memory applications. Also, the multi-port circuit architecture may be implemented as multi-port register (MPR) architecture with multiple ports for separately tracking, monitoring, simulating and/or reporting clock power consumption for each port of the multiple ports. Various implementations as described herein provide for area efficient central processing unit (CPU) designs in robust multi-port register circuitry that overcome deficiencies of conventional circuitry by improving multi-port register (MPR) designs with efficient routing to reduce congestion, reduce read/write margins, and also reduce area in multi-port memory applications.

In reference to importance of dynamic power to CPU design, various schemes and techniques described herein are configured to provide accuracy in reporting dynamic power of sub-blocks. As such, various schemes and techniques described herein resolve inefficient issues of conventional circuit designs by providing multiple clock pins so that each port of multiple ports model multiple different powers (e.g., three chip-enable CEN and/or left-right-enable LREN combinations that may exist). This is practical, and various schemes and techniques described herein may fit in with existing EDA tool infrastructure, that may then add powers from multiple clock pins at the macro-level.

Various implementations of multi-port circuit architecture for multi-port memory applications will now be described in detail herein with reference to FIGS. 1-4.

Figure 1:
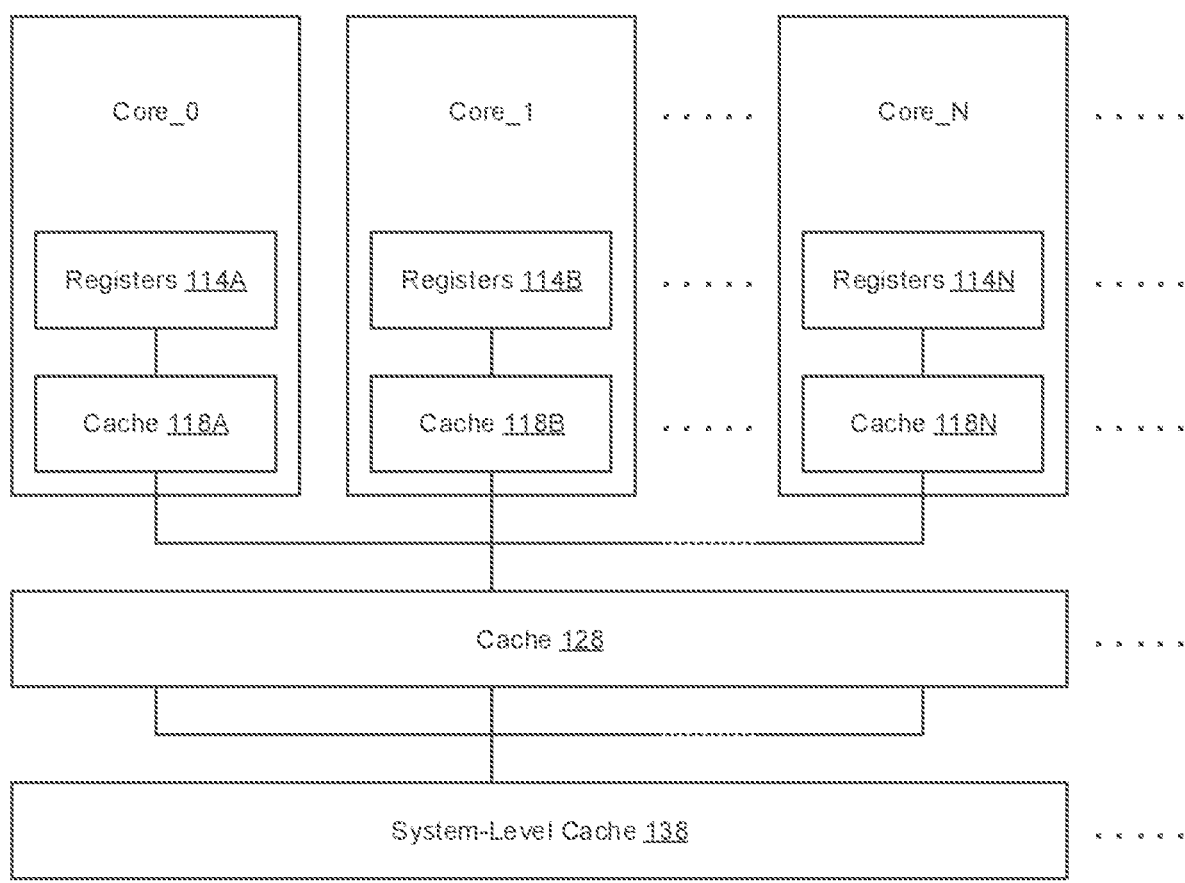
FIG. 1 illustrates a diagram of multi-core CPU architecture in accordance with various implementations described herein.

FIG. 1 illustrates a diagram 100 of multi-core architecture 104 in accordance with implementations described herein. In some applications, the multi-core architecture 104 may refer to multi-core CPU architecture with memory hierarchy.

In some applications, the multi-core CPU architecture 104 may be implemented as a system or device having integrated circuitry (IC) and various components arranged and coupled together as an assemblage or some combination of parts that may provide for physical circuit layout design and related structures. In various applications, a method of designing, fabricating, building and/or providing the multi-core CPU architecture 104 as an integrated system or device may involve use of IC circuit components described herein so as to thereby implement various configurable multi-port architecture schemes and/or techniques associated therewith. Moreover, the multi-core CPU architecture 104 may be integrated with various computing circuitry and related components on a single chip, and also, the multi-core CPU architecture 104 may be implemented within various embedded systems for automotive, electronic, mobile, server and IoT applications.

As shown in FIG. 1, the multi-core CPU architecture 104 may include one or more central processing unit (CPU) cores, such as, e.g., any number (N) of CPU cores (e.g., Core_1, Core_2, . . . , Core_N) with memory hierarchy. In various applications, the memory hierarchy may refer to various memory based structures, such as, e.g., registers and cache memory, wherein each CPU core (Core_1, Core_2, . . . , Core_N) may include registers (114A, 114B, . . . , 114N) and local cache memory (118A, 118B, . . . , 118N), such as, e.g., L1 cache memory, L2 cache memory. Also, the CPU cores (Core_1, Core_2, . . . , Core_N) may be separately or collectively coupled to external cache memory 128, such as, e.g., L3 cache memory, and also, the CPU cores (Core_1, Core_2, . . . , Core_N) may be coupled to system-level cache memory 138.

In various implementations, a central processing unit (CPU) may be referred to as a processor having electronic circuitry configured to execute instructions comprising a computer software program. Also, the CPU may be configured to perform basic functions, arithmetic, logic, controlling, and/or input/output (I/O) operations specified by instructions in the computer software program. Also, the CPU may be configured to interface with one or more external components, such as, e.g., various memory (e.g., cache), I/O circuitry, and specialized processors, such as graphics processing units (GPUs).

In various implementations, the fundamental operation circuitry of CPUs may include various logic circuitry that may involve an arithmetic-logic unit (ALU) that performs arithmetic and logic operations, processor registers (e.g., 114A, 114B, . . . , 114N) that supply operands to the ALU and store the results of ALU operations, and a control-logic unit (CLU) that manages fetching data from memory (e.g., cache 118A, 118B, . . . , 118N), and also decoding and execution (of instructions) by managing the coordinated operations of the ALU, registers, ache, and various other related components.

In various implementations, CPUs may be formed with integrated circuitry (IC) as microprocessors with one or more CPUs on a single IC chip, and also, microprocessor chips with multiple CPUs may be referred to as multi-core CPUs. Also, an IC that includes one or more CPUs may include memory (e.g., cache), peripheral interfaces, and various other components formed as an SoC (System-on-a-Chip). Also, core-array processors may refer to multi-core CPUs that operate with aggregated computational resources.

In various implementations, the registers (e.g., 114A, 114B, . . . , 114N) may refer to CPU registers as hardware registers that are used by the CPUs to store frequently used data in a quickly accessible local location near to the CPUs. Also, the registers (e.g., 114A, 114B, . . . , 114N) may include fast-access storage with specific hardware functions, including read-only storage and/or write-only storage. In multi-core circuit architecture, the registers (e.g., 114A, 114B, . . . , 114N) may be addressed with various data access mechanisms including an assigned memory address.

In various implementations, CPUs may be configured to load data from a larger memory into the registers (e.g., 114A, 114B, . . . , 114N) where the data may be used for arithmetic operations and/or manipulated or tested by software instructions. Also, in some applications, the loaded data and/or manipulated data may be stored in memory, such as, e.g., in one or more cache levels (e.g., L1, L2, L3 and/or system-level). Also, in some applications, the registers (e.g., 114A, 114B, . . . , 114N) may be at the top of the memory hierarchy and thus provides a fast way to access data. For instance, holding frequently used data in registers may be critical to a program's performance.

In various implementations, the cache 118A, 118B, . . . , 118N may refer to CPU cache memory as hardware cache memory that is used by the CPUs to access data from local memory and/or external memory. Also, the cache memory 118A, 118B, . . . , 118N are smaller, faster and located closer to the CPU cores (Core_0, Core_1, . . . , Core_N), which stores copies of accessed data from frequently used memory locations. Also, in some applications, CPUs include a memory hierarchy of multiple cache levels (L1, L2, L3 and system-level), with different instruction-specific caches and/or data-specific caches at each level (L1, L2, L3 and system-level). The cache memory may be implemented with static random-access memory (SRAM), or some other similar type of memory.

In reference to importance of dynamic power in CPU design, various schemes and techniques described herein provide for improved accuracy when reporting dynamic power of sub-blocks. In modern CPUs, dynamic power is a major constraint on the overall design, and thus, accurate reporting of dynamic power consumed by sub-blocks in the CPU may be necessary. This enables the CPU designer to make accurate trade-offs on activity to manage the overall power budget. In multi-port memories, power consumed by memory sub-blocks may depend linearly on the number of ports being accessed, and also power consumed by memory sub-blocks may depend on a number of memory slices that are accessed (e.g., 2-way left-right-enable LREN).

Thus, for some usage scenarios, there may be different powers (e.g., minimum-to-maximum may change by a factor of 12-36). For a single CLK pin (as is conventional), reporting all of the powers requires modelling them as different standard delay format (SDF) conditions to a single CLK pin power in a liberty model. This may be impractical because of the processing time and size of the liberty files that would ensue. As such, a workaround for this may be to estimate the power in certain conditions, but that may require reporting pessimistic or optimistic powers, which defeats the intention of accurate power reporting. Thus, the various schemes and techniques described herein may be used to solve conventional inefficiencies by providing multiple CLK pins so that each of the multiple CLK pins may be used to model multiple different powers (e.g., for three CEN/LREN combinations that may exist). This may fit in well with the existing EDA tool infrastructure, that may then add powers from multiple CLK pins at the macro-level.

Figure 2:
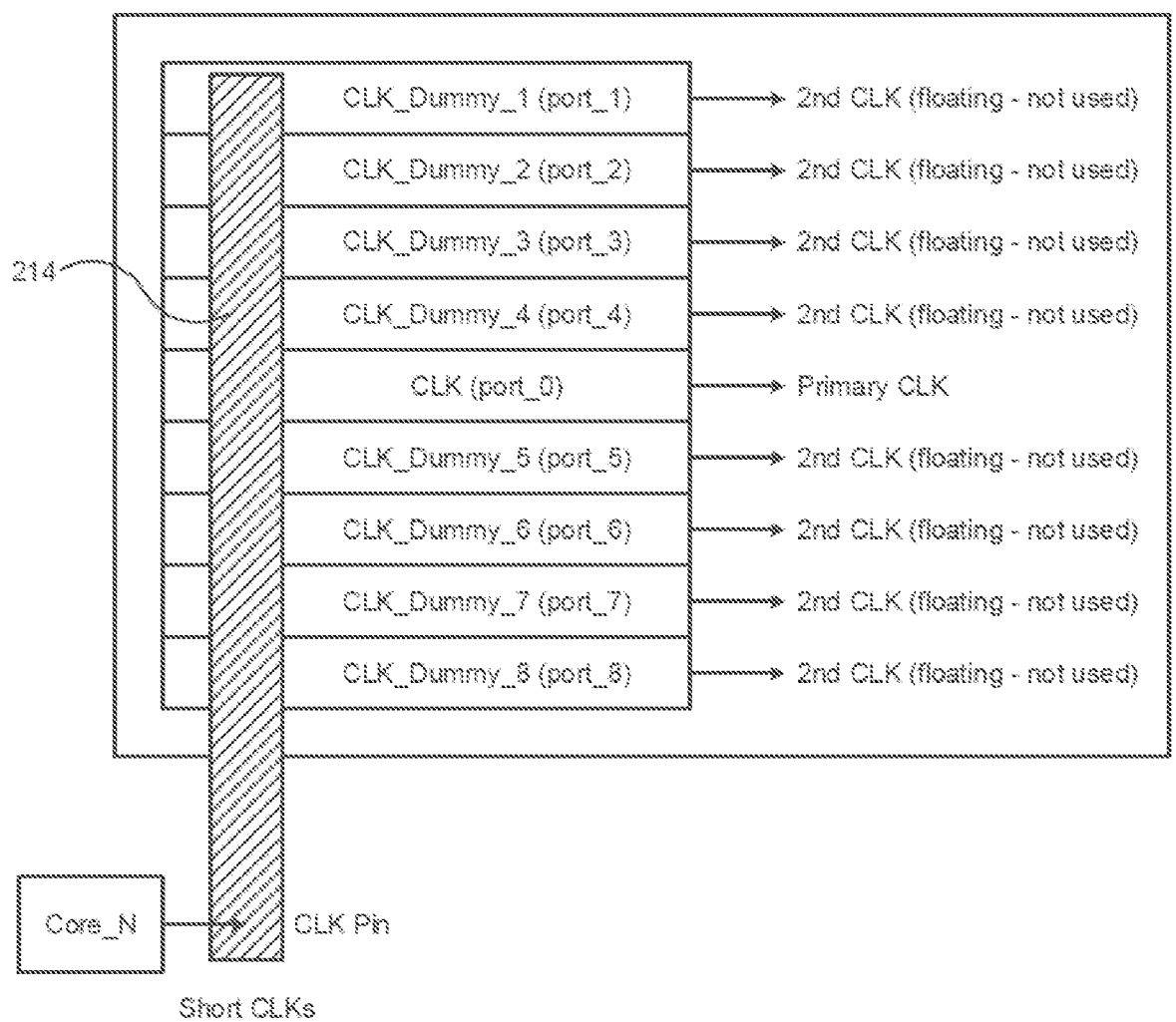
FIG. 2 illustrates a diagram of dummy clock architecture in accordance with various implementations described herein.

FIG. 2 illustrates a diagram 200 of dummy clock architecture 204 with multiple ports in accordance with various implementations described herein. In some applications, the dummy clock architecture 204 may refer to a multi-port register (MPR).

In various applications, the dummy clock architecture 204 may be implemented as a system or a device having integrated circuitry (IC) and various components arranged and coupled together as an assemblage or some combination of parts that may provide for physical circuit layout design and related structures. In various applications, a method of designing, fabricating, building and/or providing the dummy clock architecture 204 as an integrated system or device may involve use of IC circuit components described herein so as to thereby implement various configurable multi-port architecture schemes and/or techniques associated therewith. Moreover, the dummy clock architecture 204 may be integrated with various computing circuitry and related components on a single chip, and also, the dummy clock architecture 204 may be implemented within various embedded systems for automotive, electronic, mobile, server and IoT applications.

As shown in FIG. 2, the dummy clock architecture 204 may include multi-port circuit architecture with multiple ports (e.g., port_0, port_1, . . . port_8), wherein the multi-port circuit architecture may be referred to as a multi-port register (MPR). Also, the multi-port circuit architecture may be configured to expand a primary clock (CLK for port_0) into multiple dummy clocks (CLK_Dummy_1, CLK_Dummy_2, . . . , CLK_Dummy_8) so as to separately track, simulate and/or report clock power consumption for each port (port_0, port_1, . . . , port_8) of the multiple ports to a central processing unit (CPU), such as, e.g., one or more of the CPU cores (Core_1, Core_2, . . . , Core_N) in FIG. 1.

In various implementations, the multi-port circuit architecture may refer to multi-port memory architecture (e.g., MPR) that is configured to expand the primary clock (CLK) into the multiple dummy clocks (CLK_Dummy_1, CLK_Dummy_2, . . . , CLK_Dummy_8) by shorting the primary clock with the multiple dummy clocks via a conductive coupling feature 214, such as, e.g., conductive signal rail, metal wire, or similar. Also, the multiple ports may have a primary port (e.g., port_0), and the primary clock (CLK) may be applied to the primary port (e.g., port_0). Also, the multiple ports may include multiple secondary ports (e.g., port_1, port_2, . . . , port_8), and the multiple dummy clocks (CLK_Dummy_1, CLK_Dummy_2, . . . , CLK_Dummy_8)

may be respectively applied to the secondary ports (e.g., port_1, port_2, . . . , port_8). Also, in some applications, the multiple dummy clocks (CLK_Dummy_1, CLK_Dummy_2, . . . , CLK_Dummy_8) may refer to secondary clocks (2nd CLKs) that may be left floating and may not be used.

In various implementations, the dummy clock architecture 204 may be referred to as multi-port circuit architecture and/or multi-port memory architecture that is configured as a multi-port register (MPR) having multiple ports (port_0, port_1, . . . , port_8). In some applications, the multi-port register (MPR) may be configured to separately monitor clock power consumption for each port (port_0, port_1, . . . , port_8) of the multiple ports. Also, the multi-port register (MPR) may be configured to individually track and/or report clock power consumption for each port (port_0, port_1, . . . , port_8) of the multiple ports to the CPU (e.g., Core_N). Also, the multi-port register (MPR) may be configured to utilize the primary clock (CLK) applied to the primary port (port_0) and the secondary dummy clocks (CLK_Dummy_1, CLK_Dummy_2, . . . , CLK_Dummy_8) applied to the secondary ports (port_1, port_2, . . . , port_8) so as to separately track, monitor, simulate and/or report clock power consumption for each port (port_0, port_1, . . . , port_8) to a CPU, such as, e.g., one or more of the CPU cores (Core_1, Core_2, . . . , Core_N) in FIG. 1.

In various implementations, the clock power consumption may refer to internal clock power consumption, and the multi-port register (MPR) may use internal control logic to separately report the internal clock power consumption for each port (port_0, port_1, . . . , port_8) of the multiple ports to the CPU. Also, the clock power consumption may refer to common clock power consumption, and the multi-port register (MPR) may use shared control logic to report the common clock power consumption for the primary port (port_0) of the multiple ports to the CPU. Also, the multi-port register (MPR) may provide the total clock power consumption to the CPU by combining together the clock power consumption for each port (port_0, port_1, . . . , port_8) of the multiple ports.

Various implementations described herein may be used to simulate and model multi-port memory as single port, e.g., in multi-port memory applications by incorporating the use of at least one real clock (e.g., 1) and multiple dummy clocks (e.g., 8), wherein all of these clocks (e.g., 9) are shorted into a single clock (e.g., 1 clock). In this application, clock power may be counted separately per port so that power consumption per port may be reported to the CPU individually to thereby track/monitor power for each port and report power accurately so as to identity power consumption in real time. In some applications, a real clock may be used by design and dummy clocks may be added and used to model power for individual clock ports in multi-port clock applications, and then total power may be added together at end. Some schemes and techniques described herein may be used to model multiple clocks into a single clock by using a modified dummy clock methodology to model clock power with, e.g., liberty modelling techniques. Also, internal clock power consumption and shared clock power consumption for the multiple ports may be tracked, monitored, simulated and/or reported to a CPU. In addition, some common control logic may be shared for multiple ports, and shared control power for port_0 may be reported to the CPU so as to avoid over-counting the common control power.

Figure 3A:
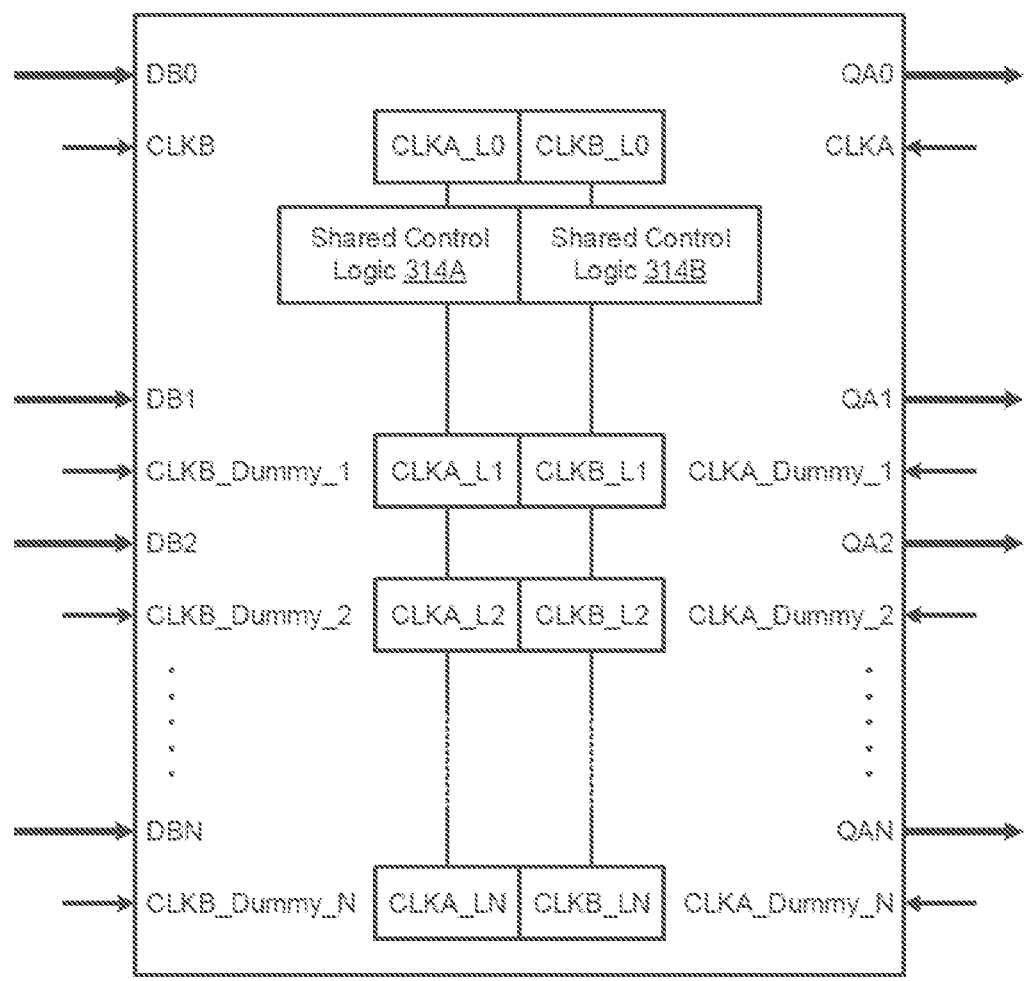
Figure 3B:
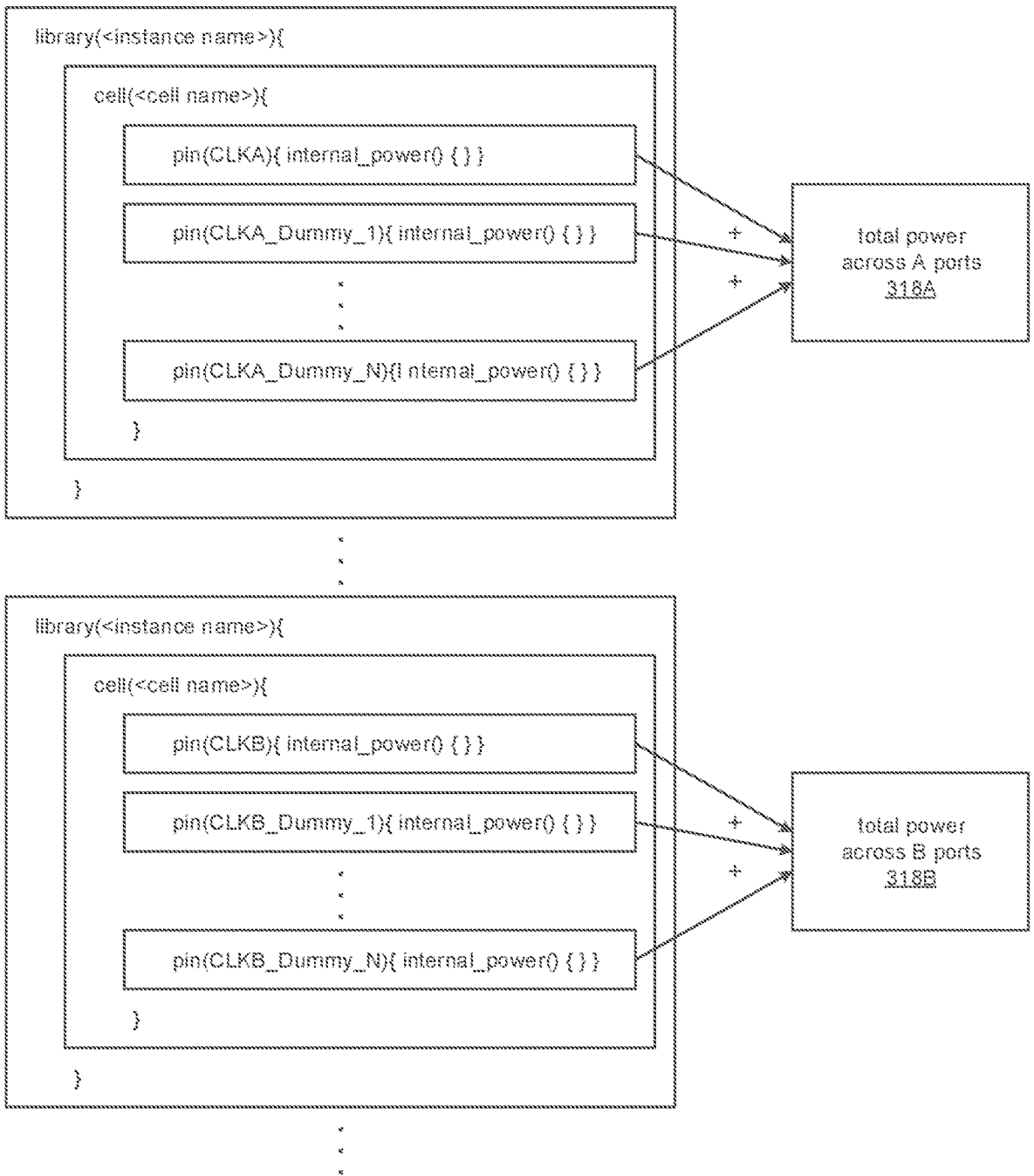

FIGS. 3A-3D illustrate various diagrams related to dummy clock architecture 304 having multiple ports for related multi-port register (MPR) applications in accordance with various implementations described herein. In particular, FIG. 3A shows a diagram 304A of the multi-port register (MPR) 308, FIG. 3B shows a diagram 304B of a library instance for the multi-port register (MPR) 308, FIG. 3C shows a code diagram 304C of a software instance for a first clock (CLKA) related to the multi-port register (MPR) 308, and also, FIG. 3D shows another code diagram 304D of another software instance for a second clock (CLKB) related to the multi-port register (MPR) 308.

In various applications, the dummy clock architecture 304 or multi-port register (MPR) 308 may be implemented as a system or a device having integrated circuitry (IC) and various other components arranged and coupled together as an assemblage or some combination of parts that provide for physical circuit layout design and related structures for memory/register related applications. In various applications, a method of designing, fabricating, building and/or providing the dummy clock architecture 304 and/or MPR 308 as an integrated system or device may involve use of the IC circuit components described herein so as to thereby implement various configurable multi-port architecture schemes and/or techniques associated therewith. Also, the dummy clock architecture 304 and/or MPR 308 may be integrated with various computing circuitry and related components on a single chip, and in addition, the dummy clock architecture 304 and/or MPR 308 may be implemented within various embedded systems for automotive, electronic, mobile, server and IoT applications, including remote sensor nodes.

In some implementations, as shown in FIG. 3A, the multi-port register (MPR) 308 for in reference to the dummy clock architecture 304 may include multiple ports (DB0, DB1, . . . , DBN and QA0, QA1, . . . , QAN) that are configured to expand primary clock port (CLKA and CLKB) into multiple dummy clock ports (CLKA_Dummy_1, CLKA_Dummy_2, . . . , CLKA_Dummy_N and CLKB_Dummy_1, CLKB_Dummy_2, . . . , CLKB_Dummy_N) by shorting the primary clock (CLKA and CLKB) with their corresponding multiple dummy clocks (CLKA_Dummy_1, CLKA_Dummy_2, . . . , CLKA_Dummy_N for CLKA and also CLKB_Dummy_1, CLKB_Dummy_2, . . . , CLKB_Dummy_N for CLKB) so that the clock power consumption may be separately tracked, monitored, simulated and reported for each port (DB0, DB1, . . . , DBN and QA0, QA1, . . . , QAN) of the multiple ports to the central processing unit (CPU), such as, e.g., one or more of the CPU cores (Core_1, Core_2, . . . , Core_N) in FIG. 1-2.

In various implementations, the multiple ports may include multiple input data ports (DB0, DB1, . . . , DBN) that are configured to use an input primary clock port (CLKB) and also multiple output data ports (QA0, QA1, . . . , QAN) that are configured to use an output primary clock port (CLKA). Also, multi-port register (MPR) 308 may be configured to expand the primary clock port (CLKA and/or CLKB) into multiple dummy clock ports (DB0, DB1, . . . , DBN and QA0, QA1, . . . , QAN) so that the clock power consumption is separately monitored for each port of the multiple ports. Also, multi-port register (MPR) 308 may be configured to expand the primary clock port (CLKA and/or CLKB) into multiple dummy clock ports (DB0, DB1, . . . , DBN and QA0, QA1, . . . , QAN) so that the clock power consumption is individually reported for each port of the multiple ports to the CPU.

In various implementations, the multi-port register (MPR) 308 may have various support circuitry, such as, e.g., internal control logic (CLKA_L0, CLKA_L1, . . . , CLKA_LN and/or CLKB_L0, CLKB_L1, . . . , CLKB_LN)

and shared control logic 314A, 314B, that may be used to support each port of the multiple ports. For instance, each input data port of multiple input data ports (DB0, DB1, ..., DBN) may be configured to use corresponding the internal control logic (CLKB_L0, CLKB_L1, ..., CLKB_LN) so as to expand the input primary clock port (CLKB) into the multiple dummy clock ports (CLKB_Dummy_1, CLKB_Dummy_2, ..., CLKB_Dummy_N). Also, in some instances, each output data port of multiple input data ports (DA0, DA1, ..., DAN) may be configured to use corresponding internal control logic (CLKA_L0, CLKA_L1, ..., CLKA_LN) so as to expand the output primary clock port (CLKA) into the multiple dummy clock ports (CLKA_Dummy_1, CLKA_Dummy_2, ..., CLKA_Dummy_N).

In various implementations, the clock power consumption may include internal clock power consumption, and also, the multi-port register (MPR) 308 may use the internal control logic (CLKA_L0, CLKA_L1, ..., CLKA_LN and/or CLKB_L0, CLKB_L1, ..., CLKB_LN) to separately report the internal clock power consumption for each port of the multiple ports to the CPU. Also, in various implementations, the clock power consumption may include common clock power consumption, and also, the multi-port register (MPR) 308 may use shared control logic 314A, 314B to report common clock power consumption for the primary port (DBA and/or DB0) of the multiple ports to the CPU.

FIG. 3B shows a diagram 304B of a library instance for the multi-port register (MPR) 308 in reference to the dummy clock architecture 304.

As shown in FIG. 3B, the library instance (library name) for multi-port register (MPR) 308 may include a cell block (cell name) having data structures for clock pin CLKA and CLKB. For instance, the cell block (cell name) for output clock pin CLKA may include an internal power consumption code block for output primary clock port CLKA along with a number (N) of internal power consumption code blocks for multiple output dummy clock ports CLKA_Dummy_1, CLKA_Dummy_2, ..., CLKA_Dummy_N. In another instance, the cell block (cell name) for the input clock pin CLKB may include an internal power consumption code block for the input primary clock port CLKB along with a number (N) of internal power consumption code blocks for the multiple input dummy clock ports CLKB_Dummy_1, CLKB_Dummy_2, ..., CLKB_Dummy_N.

In some implementations, total output power 318A across multiple output ports for the output clock CLKA may be generated, calculated and combined by using internal power consumption code block for the output primary clock port CLKA and also the output dummy clock ports CLKA_Dummy_1, CLKA_Dummy_2, ..., CLKA_Dummy_N. Also, the total input power 318B across the multiple input ports for the input clock CLKB may be generated, calculated and combined by using internal power consumption code block for the input primary clock port CLKB and also the input dummy clock ports CLKB_Dummy_1, CLKB_Dummy_2, ..., CLKB_Dummy_N.

FIG. 3C shows a code diagram 304C of a software instance for the first clock (output CLKA) related to the multi-port register (MPR) 308 in reference to the dummy clock architecture 304.

As shown in FIG. 3C, the data structures for the clock pin CLKA for multi-port register (MPR) 308 may include the internal power consumption code block for the output primary clock port CLKA along with the internal power consumption code blocks for output dummy clock ports CLKA_Dummy_1, CLKA_Dummy_2, ..., CLKA_Dummy_N. Also, the port-wise power for the standard delay format (SDF) along with the common power SDF may separately calculated for each output port (port_0, Port_1, ..., port_N) based on the rise and fall power number for each port (port_0, Port_1, ..., port_N).

FIG. 3D shows another code diagram 304D of another software instance for the second clock (input CLKB) related to the multi-port register (MPR) 308 in reference to the dummy clock architecture 304.

As shown in FIG. 3D, the data structures for the clock pin CLKB for multi-port register (MPR) 308 may include the internal power consumption code block for the input primary clock port CLKB along with the internal power consumption code blocks for input dummy clock ports CLKB_Dummy_1, CLKB_Dummy_2, ..., CLKB_Dummy_N. Also, the port-wise power for the standard delay format (SDF) along with the common power SDF may separately calculated for each input port (port_0, Port_1, ..., port_N) based on the rise and fall power number for each port (port_0, Port_1, ..., port_N).

FIG. 4 illustrates a process diagram of a method 400 for fabricating multi-port circuit architecture in accordance with various implementations described herein. Further, in various implementations, method 400 may be used to provide multi-port related circuitry for multi-port circuit architecture in various physical layout applications, wherein the multi-port circuit architecture may expand a primary clock into multiple dummy clocks so as to separately manage, track, simulate and/or report clock power consumption for each port of the multiple ports to a central processing unit (CPU).

It should be understood that even though the method 400 indicates a particular order of operation execution, in some instances, various certain portions of the operations may be executed in a different order, and on different systems. In other cases, additional operations and/or steps may be added to and/or omitted from method 400. Also, method 400 may be implemented in hardware and/or software. If implemented in hardware, the method 400 may be implemented with various components and/or circuitry, as described herein in reference to FIGS. 1, 2 and 3A-3D. Also, if implemented in software, method 400 may be implemented with program and/or software instruction processes configured for providing multi-port techniques, as described herein. Also, if implemented in software, instructions related to implementing the method 400 may be stored in memory and/or a database. In various instances, a computer or various other types of computing devices having a processor and memory may be configured to perform method 400.

In various implementations, method 400 may refer to a method of designing, providing, building, fabricating and/or manufacturing multi-port circuitry as an integrated system, device and/or circuit that may involve use of the various IC circuit components described herein so as to thereby implement clock power tracking techniques associated therewith. The multi-port circuitry may be integrated with computing circuitry and related components on a single chip, and the multi-port circuitry may be implemented in various embedded systems for various electronic, mobile and IoT applications.

At block 410, method 400 may be used to fabricate multi-port circuit architecture with multiple ports that are configured to use a primary clock and multiple dummy clocks in various physical layout applications, including, e.g., memory based applications. Also, in some implementations, the multi-port circuit architecture may refer to multi-port memory architecture that is configured for expanding the primary clock into the multiple dummy clocks by shorting the primary clock with the multiple dummy clocks.

At block 420, method 400 may be used to separately track, simulate and report clock power consumption for each port of the multiple ports to a central processing unit (CPU) by expanding the primary clock into multiple dummy clocks. In various instances, the multi-port circuit architecture may be configured for separately monitoring clock power consumption for each port of the multiple ports. Also, in various instances, the multi-port circuit architecture may be configured for individually reporting clock power consumption for each port of the multiple ports to the CPU.

At block 430, method 400 may be configured to utilize internal control logic for separately reporting internal clock power consumption for each port of the multiple ports to the CPU. Also, at block 440, method 400 may be configured to utilize shared control logic for reporting the common clock power consumption for a primary port of the multiple ports to the CPU. In various applications, method 400 may be configured to utilize internal control logic and/or shared control logic in various physical layout applications.

In some applications, the multiple ports may include a primary port and multiple secondary ports, and the primary clock may be applied to the primary port, and also, the multiple dummy clocks may be applied to the secondary ports. Also, in some instances, clock power consumption may include internal clock power consumption, and further, the multi-port circuit architecture may be configured for utilizing internal control logic for separately reporting internal clock power consumption for each port of the multiple ports to the CPU. Also, in various instances, the clock power consumption may include common clock power consumption, and wherein the multi-port circuit architecture is configured for utilizing shared control logic for reporting the common clock power consumption for the primary port of the multiple ports to the CPU.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Described herein are various implementations of a device with multi-port circuit architecture having multiple ports. The multi-port circuit architecture may be configured to expand a primary clock into multiple dummy clocks so as to separately track, simulate and report clock power consumption for each port of the multiple ports to a central processing unit (CPU).

Described herein are various implementations of a device having a multi-port register with multiple ports that may be configured to expand a primary clock into multiple dummy clocks by shorting the primary clock with the multiple dummy clocks so that clock power consumption is separately tracked, simulated and reported for each port of the multiple ports to a central processing unit (CPU).

Described herein are various implementations of a method. The method may fabricate multi-port circuit architecture with multiple ports that are configured to use a primary clock and multiple dummy clocks. The method may separately track, simulate and report clock power consumption for each port of the multiple ports to a central processing unit (CPU) by expanding the primary clock into the multiple dummy clocks.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to various implementations of various schemes and techniques described herein in reference to configurable multi-port circuit architecture for multi-port memory, various other implementations may be devised in accordance with the disclosure herein, which may be determined by the claims that follow herein below.

Although the subject matter described herein has been described in language specific to structural features and/or methodological acts, it is to be understood that the subject matter defined in the appended claims is not necessarily limited to the specific features or acts described above. Rather, specific features and acts described herein are disclosed as example forms of implementing the claims.

What is claimed is:

1. A device comprising:
multi-port circuit architecture having multiple ports,
wherein the multi-port circuit architecture expands a primary clock into multiple dummy clocks so as to separately track, simulate and report clock power consumption for each port of the multiple ports to a central processing unit (CPU).

2. The device of claim 1, wherein the multi-port circuit architecture comprises multi-port memory architecture that is configured to expand the primary clock into the multiple dummy clocks by shorting the primary clock with the multiple dummy clocks.

3. The device of claim 1, wherein the multi-port circuit architecture separately monitors the clock power consumption for each port of the multiple ports.

4. The device of claim 1, wherein the multi-port circuit architecture individually reports the clock power consumption for each port of the multiple ports to the CPU.

5. The device of claim 1, wherein the multiple ports include a primary port and multiple secondary ports, and wherein the primary clock is applied to the primary port, and wherein the multiple dummy clocks are applied to the secondary ports.

6. The device of claim 5, wherein the clock power consumption includes internal clock power consumption, and wherein the multi-port circuit architecture uses internal control logic to separately report the internal clock power consumption for each port of the multiple ports to the CPU.

7. The device of claim 5, wherein the clock power consumption includes common clock power consumption, and wherein the multi-port circuit architecture uses shared control logic to report the common clock power consumption for the primary port of the multiple ports to the CPU.

8. The device of claim 1, wherein the multi-port circuit architecture provides total clock power consumption to the CPU by combining together the clock power consumption for each port of the multiple ports.

9. A device comprising:
a multi-port register having multiple ports that are configured to expand a primary clock into multiple dummy clocks by shorting the primary clock with the multiple dummy clocks so that clock power consumption is separately tracked, simulated and reported for each port of the multiple ports to a central processing unit (CPU).

10. The device of claim 9, wherein the multi-port register expands the primary clock into multiple dummy clocks so that the clock power consumption is separately monitored for each port of the multiple ports.

11. The device of claim 9, wherein the multi-port register expands the primary clock into multiple dummy clocks so that the clock power consumption is individually reported for each port of the multiple ports to the CPU.

12. The device of claim 9, wherein the clock power consumption includes internal clock power consumption, and wherein the multi-port register includes internal control logic that is configured to separately report the internal clock power consumption for each port of the multiple ports to the CPU.

13. The device of claim 9, wherein the clock power consumption includes common clock power consumption, and wherein the multi-port register includes shared control logic that is configured to report the common clock power consumption for a primary port of the multiple ports to the CPU.

14. A method comprising:
fabricating multi-port circuit architecture with multiple ports that are configured to use a primary clock and multiple dummy clocks; and
separately tracking, simulating and reporting clock power consumption for each port of the multiple ports to a central processing unit (CPU) by expanding the primary clock into the multiple dummy clocks.

15. The method of claim 14, wherein the multi-port circuit architecture comprises multi-port memory architecture that is configured for expanding the primary clock into the multiple dummy clocks by shorting the primary clock with the multiple dummy clocks.

16. The method of claim 14, wherein the multi-port circuit architecture is configured for separately monitoring the clock power consumption for each port of the multiple ports.

17. The method of claim 14, wherein the multi-port circuit architecture is configured for individually reporting the clock power consumption for each port of the multiple ports to the CPU.

18. The method of claim 14, wherein the multiple ports include a primary port and multiple secondary ports, and wherein the primary clock is applied to the primary port, and wherein the multiple dummy clocks are applied to the secondary ports.

19. The method of claim 18, wherein the clock power consumption includes internal clock power consumption, and wherein the multi-port circuit architecture is configured for utilizing internal control logic for separately reporting the internal clock power consumption for each port of the multiple ports to the CPU.

20. The method of claim 18, wherein the clock power consumption includes common clock power consumption, and wherein the multi-port circuit architecture is configured for utilizing shared control logic for reporting the common clock power consumption for the primary port of the multiple ports to the CPU.

* * * * *